Figure 1:
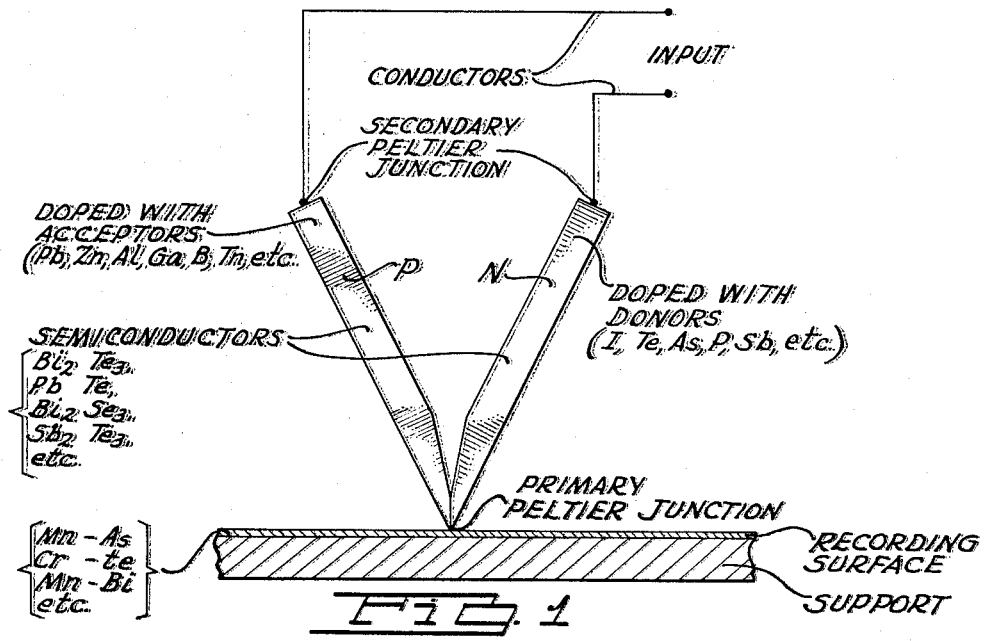

June 1, 1965   L. E. FAY III   3,187,335
MAGNETIC RECORDING BY MEANS OF A THERMAL TRANSDUCER
Filed Dec. 20, 1961

INVENTOR.
LOUIS E. FAY III
BY
Bower & Patalidis
ATTORNEYS 3,187,335
MAGNETIC RECORDING BY MEANS OF A THERMAL TRANSDUCER
Louis E. Fay III, Oxford, Mich., assignor to Ex-Cell-O Corporation, Detroit, Mich.
Filed Dec. 20, 1961, Ser. No. 160,826
7 Claims. (Cl. 346—74)

The invention relates in general to magnetic recording of information data by means of a thermal transducer and more particularly to recording by demagnetizing portions of a fully magnetized record medium by means of a Peltier effect thermoelectric junction.

It has hitherto been known that if two dissimilar materials are joined in electrical contact in such a way as to form two junctions and an electric current is forced to flow in the circuit, one of the junctions absorbs heat and the other junction liberates heat. If the current is reversed the first junction liberates heat instead of absorbing heat and the second junction absorbs heat.

It has also hitherto been known that certain materials can be magnetized by being placed for a short period of time in a magnetic field and those premagnetized materials can be caused to become randomly magnetized or, as commonly called, demagnetized by heating above a certain temperature known as its Curie temperature or Curie point.

The present invention contemplates using a thermoelectric Peltier junction in contact with a translated premagnetized record surface, and applying to the junction an electromotive force corresponding to the signal sought to be recorded in order to heat the junction to selectively demagnetize portions of the record surface and to cool the junction so as to leave other portions of the record surface unaltered. By translating the record surface at a predetermined velocity and by precise timing of the signal, a magnetic recording of the information data can thus be obtained, such recording being capable of being read by any electromagnetic transducer well known in the art.

The invention is of particular importance in relation to recording of "bits" of information data as are employed in dynamic magnetic storage devices of the tape, disc, drum, and the like, types.

One object of the invention is therefore to provide a method and means for recording information on a premagnetized medium by demagnetizing portions thereof by selective and timed localized heating above the Curie point of the materials forming the premagnetized medium.

Another object of the invention is to provide a thermal transducer capable of effecting such a recording.

A further object of the invention is to provide a thermal transducer with a low thermal inertia thereby allowing it to heat rapidly when an electric current is flowing in one direction and to cool rapidly when an electric current is flowing in the opposite direction.

Another object of the invention is to provide a thermal transducer which can be manufactured cheaply and which may operate for long periods of time without deterioration.

Figure 2:
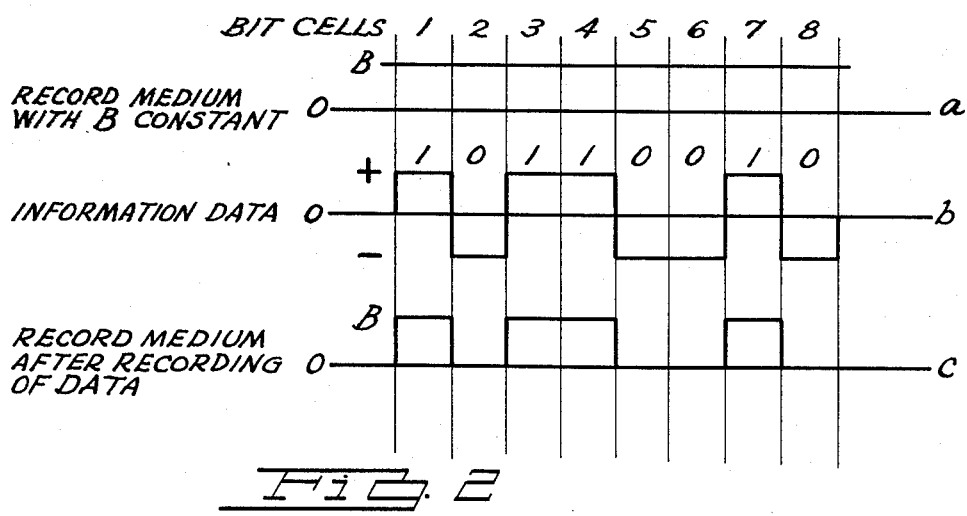

Other objects and advantages will become apparent from the following description taken in connection with the accompanying drawings, wherein:

FIGURE 1 is a schematic diagram of an apparatus constructed in accordance with the teaching of the invention; and FIGURE 2 is a diagrammatical graphical representation of wave forms plotted to a common time scale and helpful in understanding the basic principle of the invention.

The invention, as schematically represented in FIGURE 1, comprises a thermal transducer cooperating with a record support having a recording surface thereon consisting of a magnetizable material such as, for example, manganese-arsenic, chromium-tellurium or manganese-bismuth, having respectively Curie points of 45° C., 100° C. and 350° C.

The recording surface is premagnetized and is displaced in contact with the thermal transistor consisting of two rods of similar semiconductor materials such as, for example, bismuth telluride ($Bi_2Te_3$), lead telluride (PbTe), bismuth selenide ($Bi_2Se_3$), antimony telluride ($Sb_2Te_3$), or the like. One rod is a P-type doped with acceptor impurities such as lead, zinc, aluminum, gallium, etc., and the other rod is an N-type doped with donor impurities such as iodine, tellurium, arsenic, phosphorus, etc. The rods taper to a point forming a junction, identified as a primary Peltier junction in the drawing, and the free ends of the rods form two other junctions with the conductors connected thereon, identified as secondary Peltier junctions. The latter junctions act as cold junctions when the primary Peltier junction becomes hot and as hot junctions when the primary Peltier junction becomes cold. The conductors are of metal such as copper, silver or aluminum and have terminals across which an input signal in the form of a succession of electrical pulses may be applied.

When the electric current flows in one direction heat is generated at the primary Peltier junction in contact with the recording surface and heat is transmitted to the recording surface destroying the magnetism of the surface at the point of contact. When current flows in the opposite direction the primary Peltier junction is almost instantaneously cooled and the magnetized state of the recording surface is left undisturbed. By relative timed translation between the recording surface and the primary Peltier junction, a succession of unmagnetized and magnetized spots are left upon the recording surface as long as the spots sought to be demagnetized are heated above the Curie point of the materials of the recording surface, and as long as the junction is rapidly cooled to a temperature below the Curie point to leave undisturbed the spots sought to be left magnetized.

It has been experimentally found that the spots heated above the Curie point may actually be left in a magnetic state in a direction opposite to the magnetic state of the non-heated portions of the recording surface; in other words, if the recording surface has been pre-biased to a positive saturation level, for example, the heated spots tend to present a negative level rather than a zero level.

Referring now to FIGURE 2, timed bit cells on the path of the thermal transducer are arbitrarily identified as bit cells 1 to 8, for the sake of explanation. FIGURE 2(a) represents a constant magnetization level B of the recording surface previously to recording of information.

FIGURE 2(b) illustrates graphically a representation of binary number 10110010 (number 178 in decimal notation) which could be recorded by recording a "one" in bit cell 1, a "zero" in bit cell 2, a "one" in bit cells 3 and 4, a "zero" in bit cells 5 and 6, a "one" in bit cell 7 and a "zero" in bit cell 8.

FIGURE 2(c) is an idealized representation of the state of the record medium after the signal of FIGURE 2(b) has been applied across the input of the thermal transducer in such a way as to cause the junction to become hot for every negative pulse representing a "zero" and to cool by reversal of current for every positive pulse representing a "one," causing in turn the recording surface to be respectively heated above its Curie point or maintained at a temperature below its Curie point as explained hereinbefore. It is evident that in actual practice the pulses recorded on the recording surface are not as sharp as graphically represented on the diagram of FIGURE 2(c) and that the "zero" bits may actually become negative as also explained hereinbefore.

It is obvious that the principle of the invention is applicable to any method of magnetic information recording such as "return to bias," "non-return to zero," phase modulation, and the like, and it will be apparent to those skilled in the art that the compositions of materials herein given for both the thermal transducer and the recording surface, together with the physical representation of the invention in the drawings, are for illustrative purpose only, and that many other embodiments are within the scope and spirit of the invention as defined in the appended claims.

What is claimed as new is:

1. In combination: a record medium having a magnetizable surface thereon which has been premagnetized to a predetermined level; a thermal transducer in contact with said surface, said transducer comprising a P-N junction of semiconductor material capable of being heated and cooled according to the direction of an electrical current flowing therethrough; and means for translating said surface in timed relationship relatively to said transducer; whereby when said transducer is heated above the Curie point of the material of said surface, portions of said surface are selectively demagnetized in the path of said transducer, and when said transducer is cooled, other portions of said surface are left magnetized.

2. The apparatus of claim 1 wherein the electrical current flowing through the transducer is a direct current pulse.

3. In combination: a thermoelectric Peltier junction capable of becoming heated during the period of time that an electromotive force is applied to said junction to cause a current to flow thereacross in one direction and capable of being cooled as soon as the current reverses itself, said junction tapering to a narrow gap; a record medium having a magnetic surface thereon which has been premagnetized to a predetermined level, said record medium being translated in relation to said junction in contact with said gap; whereby some portions of said surface are selectively demagnetized by heating above the Curie point of the materials of said surface, and the remaining of said surface is left substantially undisturbed.

4. The apparatus of claim 3 wherein the thermoelectric junction is a P–N junction of semiconductor materials.

5. The apparatus of claim 3 wherein the electromotive force applied across the thermoelectric junction is in the shape of alternating direct current pulses of timed durations.

6. Magnetic recording comprising: Peltier junction means capable of being alternately heated and cooled according to the direction of an electric current command signal through said means; means translated in contact with said first mentioned means, said second mentioned means comprising premagnetized materials capable of being selectively demagnetized when heated above a predetermined temperature by said first mentioned means.

7. Magnetic recording according to claim 6 wherein the electric current command signal is an electrical pulse of timed duration.

References Cited by the Examiner
UNITED STATES PATENTS

| | | | |
|---|---|---|---|
| 2,915,594 | 1/59 | Burns et al. | 179—100.2 |
| 2,979,572 | 4/62 | Levin | 179—100.2 |
| 3,072,751 | 1/63 | Zworykin et al. | 179—100.2 |
| 3,094,699 | 6/63 | Supernowicz | 179—100.2 |

IRVING L. SRAGOW, *Primary Examiner.*